United States Patent
Wickman et al.

(10) Patent No.: US 6,188,873 B1
(45) Date of Patent: Feb. 13, 2001

(54) BROADBAND RADIO ACCESS METHOD, DEVICE AND SYSTEM

(75) Inventors: Johan Wickman, Bjarred; Roger Bengtsson, Limhamn, both of (SE)

(73) Assignee: Telia AB, Farsta (SE)

( * ) Notice: Under 35 U.S.C. 154(b), the term of this patent shall be extended for 0 days.

(21) Appl. No.: 09/328,799

(22) Filed: Jun. 9, 1999

Related U.S. Application Data

(63) Continuation of application No. PCT/SE97/01944, filed on Nov. 20, 1997.

(51) Int. Cl.[7] ................................................. H04B 7/19
(52) U.S. Cl. .................. 455/11.1; 455/13.1; 455/67.5; 455/422; 455/454; 455/552; 455/561; 455/562
(58) Field of Search .................. 455/454, 67.5, 455/67.1, 67.3, 426, 552, 422, 500, 7, 65, 561, 562, 11.1, 13.1

(56) References Cited

U.S. PATENT DOCUMENTS

| | | | |
|---|---|---|---|
| 5,327,572 | * | 7/1994 | Freeburg ........................... 455/430 |
| 5,771,449 | * | 6/1998 | Blasing et al. .................... 455/422 |
| 5,890,055 | * | 3/1999 | Chu et al. ........................... 455/16 |
| 5,920,607 | * | 7/1999 | Berg .................................. 455/67.1 |
| 5,949,766 | * | 9/1999 | Ibanez-Meier et al. ............ 455/427 |
| 5,956,098 | * | 9/1999 | Mizukami et al. ................. 455/207 |
| 5,991,345 | * | 11/1999 | Ramasastry ....................... 455/11.1 |
| 6,047,177 | * | 4/2000 | Wickman ........................... 455/426 |

* cited by examiner

*Primary Examiner*—Lee Nguyen
*Assistant Examiner*—Simon Nguyen
(74) *Attorney, Agent, or Firm*—Oblon, Spivak, McClelland, Maier & Neustadt, P.C.

(57) ABSTRACT

A broadband radio access method device and system includes a first wireless communication segment that operates under 10 GHz, and a second wireless communication segment that operates over 20 GHz. Coordination between the first segment and second segment occurs when establishing links with a subscriber, such that the broader band services available from the second communication link, are assigned to the subscriber, when the communications channel is available to support line-of-sight communications with the subscriber. When the communications channel does not support the second communication segment, the subscriber is assigned to operate with the first communication segment. An integrated first and second segment terminal is provided to provide a transmodulation device for converting signaling protocols between the two different segments so as to support communications between the subscriber and the intended recipient even if the two use apparently incompatible signaling protocols.

24 Claims, 4 Drawing Sheets

MLBS WITH DRAWN 500m RADIUS, MICROCELL

IS WITH DRAWN 500m RADIUS, MICROCELL

MLR WITH DRAWN 300m RADIUS, MICROCELL

MKBS, MACROCELL

BROADBAND RADIO ACCESS METHOD, DEVICE AND SYSTEM

This application is a continuation of PCT/SE97/01944, filed Nov. 20, 1997.

BACKGROUND OF THE INVENTION

1. Field of the Invention

The present invention relates to a method, device and system for providing broadband radio access with a high degree of coverage and a high system capacity even in congested areas where obstacles to line-of-sight communications are present. More particularly, the present invention relates to a method, device and system for broadband radio access that includes a millimeterwave (ML) system segment integrated with a microwave (MK) system segment.

2. Discussion of the Background

Local Multipoint Distribution Service (hereinafter LMDS), Multipoint Video Distribution System (hereinafter MVDS) and High Capacity Point to Multipoint (hereinafter HPMP) are examples of ML systems, while Multipoint Microwave Distribution System (hereinafter MMDS) and terrestrial-based television (hereinafter terrestrial TV) systems are examples of microwave (MK) systems. ML systems operate as fixed point to multipoint radio systems at frequencies over 10 GHz. By having fixed high frequency systems over 10 GHz makes it possible for simple construction of cellular systems where very good frequency utilization factors (less than or equal to 1) can be achieved. Good frequency utilization allows for a larger amount of information to be transmitted over a predetermined bandwidth. Furthermore, ML systems also have the opportunity to operate at available, unused frequency bands over 20 GHz, which makes it possible to use such systems to achieve excellent system capacity that support broadband access for many subscribers.

As recognized by the present inventors, a problem with using frequencies above 10 GHz, is that the radiowave propagation between terminals is primarily achieved through line-of-sight (hereinafter LOS) communications. The communication channel at this frequency is obstructed with physical structures, which blocks the radiowaves. Such obstacles include buildings, trees, and foliage, or even terrain obstacles such as hills and naturally occurring obstructions. This LOS requirement has been verified at these frequencies by initial propagation measurements taken at Telia Research, as well as from Bellcore and Texas Instruments, for example. Developed urban areas as well as residential areas pose a problem for LOS communications, particulary for subscribers in low buildings surrounded by higher surrounding vegetation and buildings. Generally, even though the broadcast antenna from the ML base station may be elevated, the communication range is limited to less than about 5 km from the base station due to, for example, high propagation attenuation and attenuation by rain, or any other channel obstructions.

MK stems operate under 10 GHz and are not as restricted by the line-of-sight channel requirement as is the case for ML communication systems. Accordingly, it is possible to employ MK base stations having a base station antenna (BSA) and a subscriber's terminal antenna (ATM) being located closer to the ground than for ML systems, and also with obstructions placed therebetween. This is the case, because radio frequencies under 10 GHz are generally capable of penetrating the obstructions to some extent, and have diffraction properties that are more favorable than at the higher frequencies. Accordingly, from a service provider perspective, the number of subscribers who could be covered by an MK system increases thereby obtaining greater potential subscribership for a predetermined geographical area.

However, it is recognized by the present inventors that technical problems associated with MK systems is that at the lower frequencies the electromagnetic energy propagates better, and therefore a lower frequency repeating factor (reuse rate) results in a lower system capacity. Accordingly, even though a large number of subscribers may be covered by a single transmitter, only a small portion of the subscribers can actually use the MK system, due to the lowered capacity of the MK system and its associated limited frequency repeating factor. While it is possible to use higher level modulation techniques to provide a greater amount of information per modulation symbol, the higher modulation level does not actually increase, in a significant way, the system capacity because larger signal/noise ratios (S/N) are required to support the more advanced modulation schemes. Consequently, the total system capacity for cellular applications will not necessarily increase with MK-systems that use a higher modulation level.

A description of such modulation techniques, as well as other background art devices and methods associated with the above described communication concepts and the present invention, may be found in Sklar, B., "Digital Communications Fundamentals and Applications", Prentice Hall, ISBN 0-13-211939-0, 1998. For wireless cable and other communication systems and components that operate above 1 GHz, a discussion is found at Berkoff, S., et al., "Wireless Cable and SMATV", Baylin Publications, ISBN 0-917893-17-4, 1992. The entire contents of these two references, being incorporated herein by reference. For convenience, a summary of features and attributes of MK systems and ML systems, is provided in Table 1, which follows.

TABLE 1

Frequency comparison for fixed, broadband radio access. The comparison is comprehensive and describes typical differences rather than absolute data.

| | Frequency | |
| --- | --- | --- |
| Features | MK-system <10 GHz | ML-system >20 GHz |
| Range: | high (typically <50 km) | medium (typically <5 km) |
| Frequency repetition: | low–medium | good |
| Modulation: | 4–6 bit per symbol | 2 bit per symbol |
| Demand for line-of-sight: | medium | high |
| Supply of bandwidth: | low–medium | high |
| Uplink: | low capacity | medium–high capacity |
| Physical size, directional antenna: | medium | small |

SUMMARY OF THE INVENTION

One object of the present invention, is to overcome the above-identified limitations with conventional system devices and methods.

Consistent with the title of the present section, a summary of selected attributes of the present method, device and system, are provided below. However, a more comprehensive understanding of the present invention is found in the section entitled "Description of the Preferred Embodiments".

The present method, device and system are directed to a broadband radio communication access service that successfully integrates a microwave system (MK segment) with a millimeterwave system (ML segment) in a single system so as to provide seamless broadband radio access to subscribers located in a predetermined geographic area. The system includes an integrated microwave and millimeterwave system for broadband radio access terminal (IMMBRA) that communicates with system assets using the ML segment, where possible, and allocates MK communication resources to other system components in which ML communications cannot be achieved. The IMMBRA terminal includes a transmodulator, which is able to convert a signal from one signaling format (perhaps used in the ML segment) to another signaling format (perhaps used in the MK segment). By transmodulating signals, it is possible to provide seamless communications through the IMMBRA for distributing and routing information in a wireless configuration, and a reliable and efficient manner. By integrating the MK segment and the ML segment, it is possible to, in a flexible manner, construct an optimal infrastructure for different types of geographic areas. Thus the degree of coverage and range can be significantly improved using the "hybrid" system for the task that it is best suited for subscribers' locations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
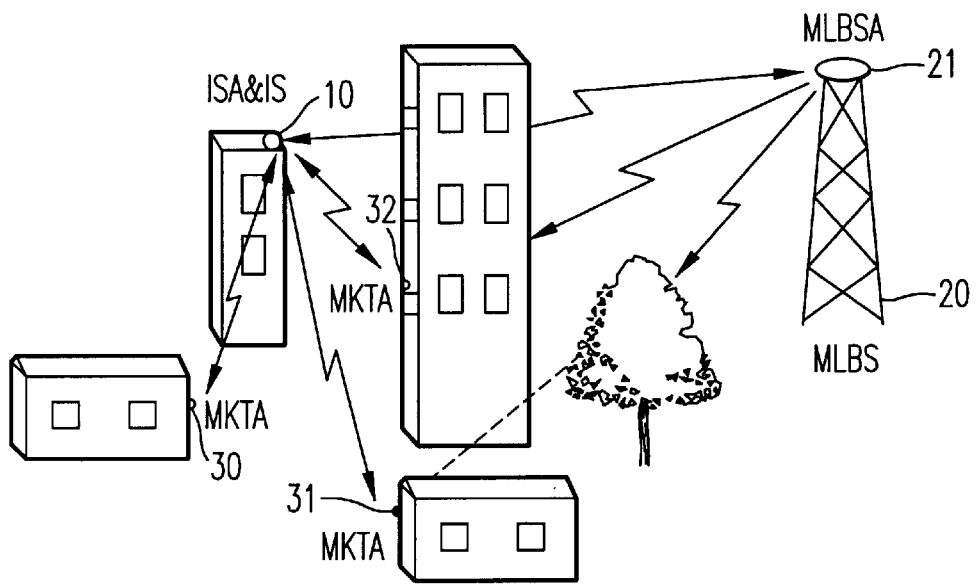
FIG. 1 is an illustration of an IMMBRA-based system that includes a ML segment and an MK segment, as well as obstructions that interfere with communications on the ML segment.
Figure 2:
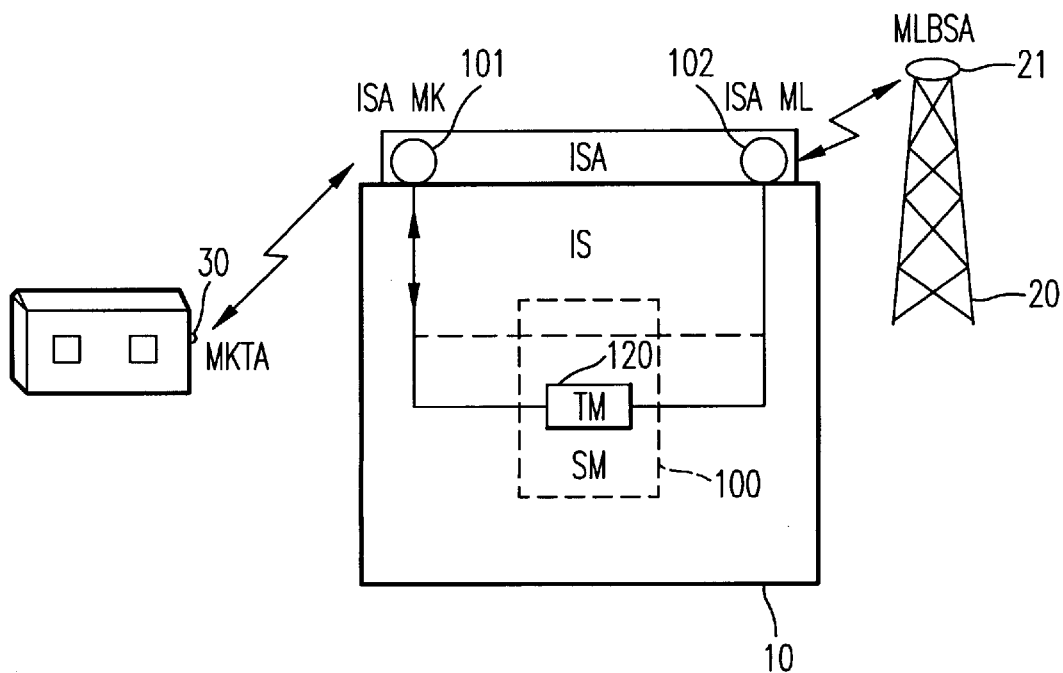
FIG. 2 is an illustration of a IMMBRA-based system, that includes a transmodulation unit configured to transmodulate signals between the ML and MK segments.

Referring now to the drawings, wherein like reference numerals designate identical or corresponding parts throughout the several views, an integration of microwave and millimeterwave systems for broadband radio access (IMMBRA) system is shown in FIGS. 1 and 2. In FIG. 1, as seen, an IMMBRA station (IS) 10, is shown with an IMMBRA station antenna (ISA) mounted on top of a relatively small building. The IS station 10 communicates over an MK segment, with each of MK terminal antennas 30, 31 and 32 as shown. Each link operate under 10 GHz, consistent with the type of communications service employed to provide the MK segment of the IMMBRA system. As seen, the IS 10 provides a communication path to the relatively close-in MKTAs 30, 31 and 32, which are in the shadows of a larger building, or tree with respect to an LM base station (LMBS) 20. Moreover, even though a LMBS antenna (LMBSA) 21 is mounted on top of a tower at the LMBS 20, the obstructions in the communication path between the LMBSA 21 and different subscribers located underneath of the LMBS 20 tower, are obstructed. Accordingly, in order to provide coverage within the IMMBRA coverage area, the IS 10 provides conductivity amongst the different MKTAs 30, 31 and 32, as well as with the LMBS 20.

One type of LM segment is LMDS, which is of American origin and includes distributive and two-way fixed broadband services. LMDS systems are allocated around 28 GHz (with a 1 GHz bandwidth), but in the future may also be licensed to operate at 41 GHz (with a 2 GHz bandwidth). In Europe, a MVDS system, operates at this higher frequency band. A difference between MVDS and LMDS is that MVDS originally was intended to be a distributive system. Several manufacturers, however, are producing a return channel for MVDS-systems, which make the MVDS and LMDS more similar. Recently, a discussion has been initiated in England about allocating 42.5–43.5 GHz frequencies to MVDS, for use in multimedia applications. As used in the present document, ML systems, may include LMDS systems, MVDS systems, or other systems above 20 GHz.

An attribute associated with systems that operate above 20 GHz, is that in these frequency bands there is plenty of unused frequency space. The high propagation attenuation, however, limits the range of communication thus limiting the amounts of energy that reach neighboring cells, and interferes with transmission within those other cells. Accordingly, a cellular (cell radius less than 4 km) interactive broadband network is realized by using a small antenna with a high directivity and built-in baseband down converters. Digital Video broadcasting (DVB) satellite receivers or DAVIC LMDS-receivers can be used to decode video films and data. DAVIC (digital audio-video council) is a non-profit association registered in Geneva, and identifies specifications for defining technical tools including level of performance for given tools such as TV-HDTV, bandwidth return channels and the like. DAVIC specifications 1.0, 1.1, 1.2, 1.3, and 1.4, available from the DAVIC web site having address at www.DAVIC.org, are incorporated by reference herein. The DAVIC LMDS-receivers are used to decode video films and data. The satellite specification of DVB is internationally accepted and it is thus expected that a large quantity of DVB-receivers will be manufactured. A modulation for such systems is quadrature phase shift keyed (QPSK), which is not as spectrum efficient for an individual channel as, for example, 64-QAM, but is considerably more robust. However, the total system capacity (i.e., spectrum efficiency with QPSK for a surface covering cellular system) is higher if the carrier to interference (C/I, which is a measure of the useful energy in relation to noise energy) levels are considered. A higher C/I allows a frequency band to be reused to a greater percentage, even in the presence of a neighboring cell. The system capacity can further be increased by dividing the cell into sectors, using sectorized antennas or separate discrete antennas and/or using polarization diversity to also divide the sector into polarization-discrete zones, or so as to help isolate the respective antennas between the adjacent sectors.

HPMP systems operate in a range of 10–27 GHz and are primarily symmetrical with regard to uplink and downlink capacity. System range, and cell size, become larger than for higher frequencies (greater than 27 GHz), whereas available bandwidth is considerably smaller. HPMP systems are possible alternatives in thinly populated areas and as initial systems in already developed areas or industrial areas to promptly offer telephony, ISDN or n×2 Mbit/S connections to companies and has connections to/between base stations for mobile telephony. The capacity with a moderate frequency allocation will be too small for a general broadband system in a built-up area.

MMDS systems, or wireless cable-TV systems as they are often called, operate around 2.5 GHz and are alternatives to existing cable TV-networks. Furthermore, MVDS systems and LMDS systems have much in common, whereas MMDS systems differ fundamentally from MVDS and LMDS systems. In more detail, MMDS is used today as a system that gives maximum coverage of a large area by transmitting at a high output power. According to the present invention, an MMDS system unit is used that transmits with a very low power to make possible a spatial repetition of frequencies in more localized zones than if larger transmit power were employed. Moreover, by transmitting in a lower power, the possibility to interfere with other cells is minimized. Accordingly, by transmitting with a low power it is possible to benefit from favorable propagation properties below 10 MHZ in the neighborhood of the transmitter, which is an attribute of the present invention.

The allocated spectrum for MMDS in the United States is limited to 200 MHZ, but Europe has not allocated the same band such that the range of a few 10 km, results in a large coverage area. For low frequencies that are primarily allocated to mobile applications, it is difficult to find a free spectrum band and to obtain a frequency license to operate in that region. To achieve an acceptable capacity on the limited bandwidth, 64-QAM is used with high demands on C/I, which makes it more difficult to operate with more than one operator in a predetermined geographic region. Moreover, by using the 64-QAM advance modulation scheme requires an increased C/I in order to support the communication, therefore increasing the amount of interference on a particular frequency band between competing MMDS users. In addition, antennas with high directivity at 2.5 GHz are difficult to manufacture and are large, which makes an uplink antenna at each individual subscriber impractical.

Because the MK segment according to the present invention operates at a lower power, over a limited geographic region, the lower power transmission reduces the demand for a high directivity of the subscriber antenna. However, a return channel within present MMDS-frequency bands would disturb the downlink so heavily that the system would be challenging to realize. Alternatively, with regard to providing a return channel, the option of providing for separate frequency bands is possible or even preferable, via another media. For example, other links include public switch telephone network (PSTN) line, or even DECT. As for efficiency sake and for the preservation of the MK segment resources, it is preferable to employ a return channel that is outside the MK band. Alternatively, a return channel in the MK band can be used, albeit at a relatively narrow bandwidth. In selected situations, a broader band return channel may be possible within the MK band provided other system resources do not demand the available capacity.

In the United States, MMDS systems have a comparatively large spread, in spite of a limited supply of frequency allocations. For example, TELE TV (a cooperative effort between NYNEX, Bell Atlantic and Pacific Telsis) has ordered approximately three million digital set-top-boxes from Thomson, with an integrated telephone modem as a return channel. The set-top-box is based on MMDS reception over cable specifications of DVB or DAVIC. The modulation in this mechanism is made using 16, 32, 64 or 256 QAM.

Terrestrial TV-systems include systems for distribution of TV, video and data, but also include a terrestrial return channel. The expansion of the digital terrestrial network in Sweden has been suggested, and within DVB interactivity is investigated, either via the PSTN, DECT, or terrestrial return channel, for the decoding of data, sound and videos made with a DVB terrestrial-top-box. The modulation is of an orthogonal frequency division multiplexing (OFDM) type. Nonetheless, even though OFDM modulation is used and is different from MVDS, MMDS and terrestrial TV, the DVB-receivers have many components in common, for instance the same circuits can be used for coding and interleaving. Furthermore, according to the present invention, software-reprogrammable processing devices may be used to trans-modulate between the different types of communication segments so that seamless communications may be provided between the different segments.

For convenience, features and attributes of LM-based systems and MK-based systems are as follows By millimeterwave (ML)-systems, the following is referred to:

<5 km general cell radius at LOS cellular system frequency band >20 GHz low output power (typically <−52 dBW/Hz)

broad frequency band (of the magnitude 1 GHz)

high uplink capacity small directional antennas with a high directivity

By microwave (MK)-systems, the following is referred to:

<50 km general cell radius at LOS.

not necessarily a cellular system.

frequency band <20 GHz.

low to high output power (repeaters have a low output power, whereas a base station has a high output power).

medium large frequency band (of the magnitude 100 MHZ).

low-medium uplink capacity.

medium sized directional antennas with a medium high directivity.

Returning to FIG. 1, and the IMMBRA system described therein, the MLBSA 21 is located in a high location relative to the surrounding obstacles. For example, the MLBSA 21 is shown to be mounted on the top of a tower, however a high building, natural geographic feature, or other suitable elevated location is a possibility. The MLBSA covers the surrounding area by using an omni-directional antenna, or even sectorized antenna subsystems. When sectorized antenna subsystems are used, the separate antennas in the subsystem are arranged around a periphery of the elevated platform so as to provide communications to the different coverage areas offered by the discrete antennas. For better isolation, polarization diversity may be used between adjacent of the individual antennas. Furthermore, spatial diversity may be used to isolate the different sectors, by using antennas having relatively high gains. In any event, subscribers within about 100 to 1000 meters from the MLBS 20 have LOS communications with the MLBS 20. At further ranges, LOS communications may be limited for subscribers who are positioned in low lying locations or with obstacles located between the MLBSA 21 and the subscriber. Moreover, as the distance between the MLBS 20 and the subscriber increases, the probability the blockage occurring increases. Accordingly, there is a strong correlation between coverage range and line-of-sight availability for ML-based systems.

The IMMBRA station antenna (ISA) is placed on an elevated platform such as a building, a pole or other tall structure. By being elevated, low propagation attenuation is present between the ISA and the MLBSA 21, which benefits from direct, uninhibited line-of-sight communication. Functional and structural attributes of the ISA and IS 10 are described by way of FIG. 2.

As shown in FIG. 2, the IS 10 facilitates communications with the MK segment to the MKTA 30, and also on the ML segment to the MLBS 20. In order to carry out these communications between the two segments, the IS 10 includes an antenna, ISA 101 for the MK segment. The IS 10 also includes an antenna, ISA 102 for the ML segment the ISA 101 and ISA 102, may provide bidirectional communications, by incorporating a diplexer. Alternatively, separate antennas may be used for transmit and receive components of the respective segments. Although not shown, transceiver front ends for processing receive signals, and for forming and amplifying transmission signals, are provided between the antennas 101, 102 and the controller 100. In the controller 100, is a transmodulation device 120, that converts between the different modulations used in the ML segment and MK segment, so that communications may be performed between subscribers that use the different segments. The transmodulation device is also able to accommodate other non-ML and MK segment signals, such as wireless links in other frequency ranges, and wired links.

Generally, the IS 10 includes the MK segment operating at less than 10 GHz, and the ML segment that operates above 10 GHz, but preferably above 20 GHz. The controller 100 (SM) handles the reformatting of data between the MK segment and the ML segment. The controller 100 forwards data between the MLBS 20 and MK terminal so as to provide a seamless communication link between the two and for providing coverage to subscribers who do not have line of sight access to the MLBS 20. Communication with the MLBS 20 is made using the ML segment and communication with the MK terminal is made using the MK segment. The ISA 102 for the ML segment includes an elevated high gain antenna that is directed towards the MLBSA 21. The MK terminal connected to the MKTA 30 down converts the receive signal to baseband for processing. Once down converted to baseband, the signal is delivered to a processor, such as a television, computer, set top box, appliance or the like. The MK terminal may generically be referred to as a microwave-set-top-box. The information exchanged by way of the transmission over the MK segment, is usually made at an application layer in the protocol employed at the MK terminal, physically within the subscriber's TV, computer, or other processing mechanism.

The IS 10 may include a ML terminal, a MKBS and/or even a MK repeater. Such components perform functions according to the general IS architecture shown in FIG. 2, where the IS 10 is shown as being an integrated unit that has a controller 100. The controller 100 will be described in more detail in FIG. 5.

The ML terminal is a terminal that decodes data to baseband from millimeterwave frequencies and from baseband to millimeterwave frequencies. To this end, the ML terminal has attributes of ordinary subscriber terminals that receive data directly from an MLBS 20, but is able to manage higher data rates. The IS 10 and MK base station have many similarities where both function as a base station on MK frequency bands. The IS 10 however includes additional devices and functionality that allow it to pass signals via the ML frequency band. The MKBS receives data in a baseband format from a fixed connection, such as copper, fiber, or a radio link and transmits the same via the MK wireless segment. The transmodulator 120 which is included within the controller 100 in the form of software implemented on a processor. Alternatively, the transmodulator may be separable from the controller 100, as a discrete device. The transmodulator 120 performs the function of changing modulation schemes between transmissions on the ML segment and MK segment so that the overall system performance, and system capacity may be optimized. The transmodulator 120, includes encoding/decoding, interleaving/deinterleaving, channel equalization, channel/link control, and other protocol conversion mechanisms, to convert from one signaling protocol to the next, depending on user requirements and the actual signaling protocols used on the ML segment and the MK segments. While when establishing the service requirements for different subscribers, the signaling protocols may be stored and saved at the controller 100 at that time. Alternatively, the subscribers may automatically request the type of service and transmodulation service required by including a preamble or other indication in the signal itself, which reconfigures the transmodulator 120, to convert from one signaling format to the signaling format associated with the called party. The controller 100 may include a computer readable media that holds the signaling attributes associated with the different terminals that identify themselves in communication systems between that terminal and other terminals. For example types of transmodulation that may occur, include QPSK (quaternary phase shift keying), QAM, and OFDM. However, other modulation schemes may be included as well, including even pulse position modulation, various types of M-ary signaling schemes and phase modulation schemes.

Satellite master antenna television (SMATV) and CATV-industry equipment may be used as separate components of the transmodulator 120. Such circuits may be used to transform QPSK-modulated satellite signals for example, to QAM-signals when the signals are "transported" using cable networks.

The ISA MK 101 and ISA ML 102 may be integrated together in one ISA as shown in FIG. 2. In selected situations, however, it may be advantageous to use separate antenna units to give adequate ISA ML LOS to the MLBSA 21 so as to optimize coverage on the ML segment. The ISA MK 101 may include high directivity, so as to reduce disturbances for base stations and other subscribers.

The MK terminal antenna MKTA 30 is placed on or at the subscriber's house or apartment depending on which coverage is wanted. A mast may also be used to place the MKTA 30 in positions above surrounding obstacles. Subscribers that have LOS communications with the MLBSA 21, will also use an antenna and terminal configured to operate with the MLBS, so as to minimize the amount of loading on the MK segment. However, subscribers that do not have LOS coverage with the MLBS 20 will be assigned an MKTA 30 that provides for coverage in spite of obstacles that might occur in the communications channel. Because communication with subscribers is made on the MK band, connections can be established even though a direct LOS is not achieved. Accordingly, low buildings can be covered in spite of possible surrounding high vegetation. MK communication is made possible at lower heights with elements that are not line-of-sight, so that sufficient frequency repeating qualities may be achieved.

ML communication on the other hand, is made at higher heights, which increase the probability of LOS communication. The frequency-repeating properties of the ML segment are sufficient because the ML band is broad and the propagation attenuation is high, therefore avoiding or restricting the amount of interference with adjacent cells. The controller 100 is configured to connect a subscriber with LOS coverage to the MLBS to be connected directly thereto, so as to avoid communications through the IS 10. The switching function can occur through an automated process, with subscriber terminals that communicate either on the MK band or the ML band, or alternatively, may be permanently assigned, such that subscribers that have line-of-sight conductivity with the MLBS 20, are equipped with ML terminals for direct communications thereto. In this way, the use of the broader ML band is maximized to its fullest, and the capacity loading on the narrower MK band is reduced. The combination of using the ML segment and the MK segment contributes to an increase in the separation of MK-based systems thereby further reducing the probability of self-interference between adjacent MK cells.

Figure 3:
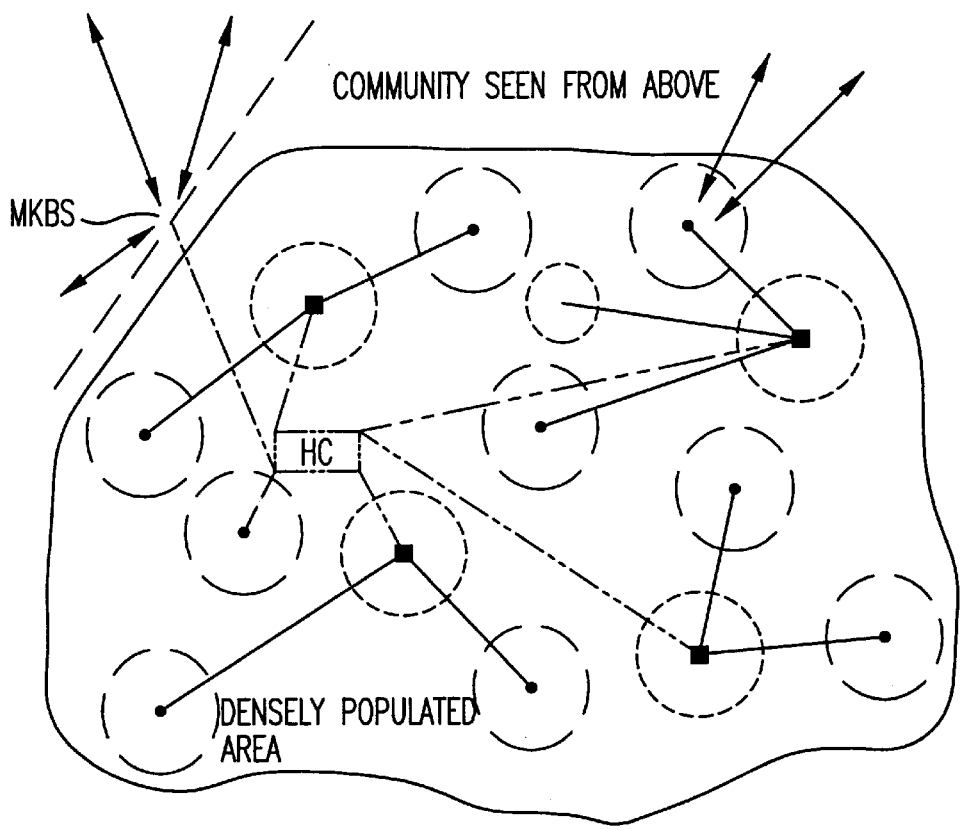
FIG. 3 is a coverage area map configured to show different ML and MK cells interlinked according to the present invention.
Figure 3:
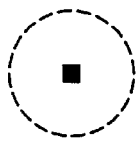
Figure 3:
Figure 3:
Figure 3:

ML repeaters of the same type as that used in the ML system may be used to provide sufficient isolation between two MK coverage areas so as to further reduce disturbances, as is seen for example in FIG. 3. In this way, expensive infrastructures such as video coders, program offerings, video servers and transport networks, may be shared between MK-based segments and ML segments. It is possible to use the MK segments for use in macro-cell applications, as is seen in FIG. 3, for cell radii over 5 km. An MKBS or IS can also catch subscribers in thinly populated areas using directional antennas as seen for example in the upper left hand corner of FIG. 3. Similarly, the right hand corner of FIG. 3 shows how an IS may be used with directional antennas to communicate with subscribers outside of the densely populated area. For subscribers who only require certain interactivity, MK base systems may be used in combination with DECT links or land-line connections (by way of modem).

In a macro cell context, the IS 10 is used with a directional antenna to provide coverage to subscribers who are outside the densely populated area. In this configuration, subscribers as far as 10 km from the densely populated community may be covered. However, within the densely populated area for narrow band to broadband activity, MK segments may be used in micro cell/small cell applications, that are connected via the MLBS or main central controller, such as is shown in FIG. 3. The main central controller includes a processor-based controller, that controls signal flow between different cells, whether they be ML-based or MK-based. The HC may also serve as a transmodulator, where needed. The HC also includes interconnections between the respective cells, that may be in the form of dedicated communication links, whether wireless or wired. Combined DVB receivers which can decode several applications, may be used in this system such that the receivers may be "universally" applicable. Such receivers can be sold to subscribers who use different types of systems such that customers need not change the receiver or set-top-box, when they choose to use a different antenna radio system.

Figure 4:
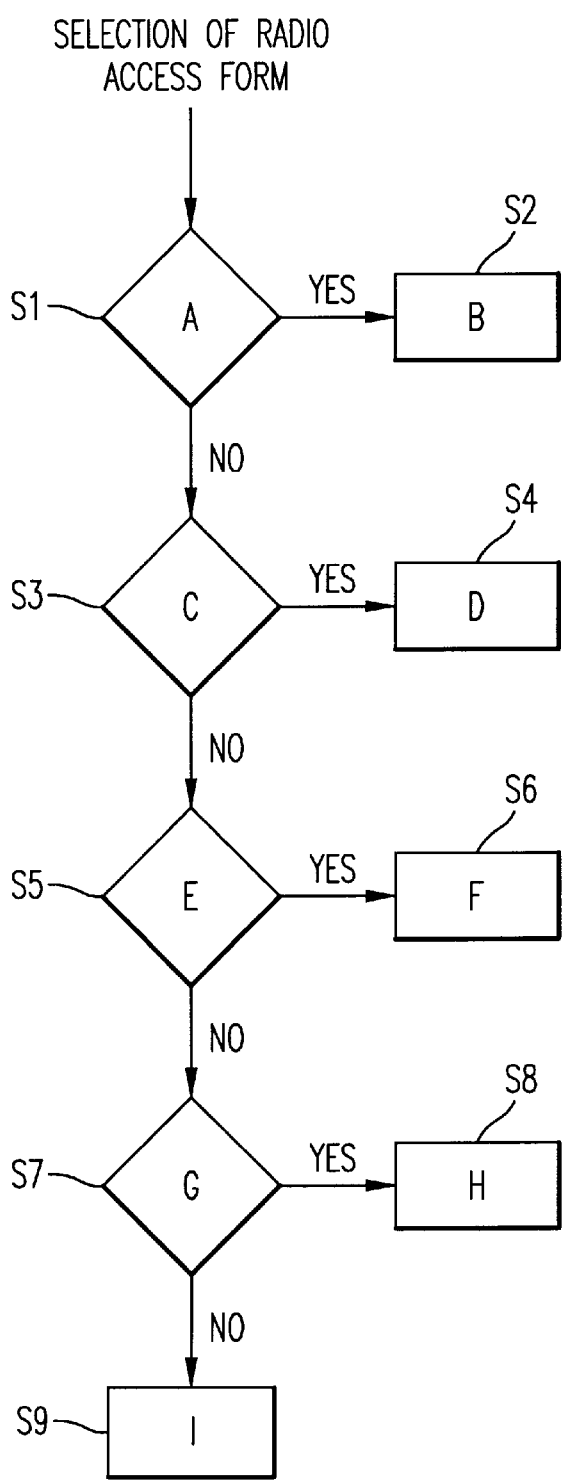
FIG. 4 is a flow chart illustrating a radio access method according to the present invention.

FIG. 4 describes a process flow for providing the selection of a radio access form for a specific subscriber. The message is for employing a protocol and a link for selection of radio access and providing broadband interactive communications for the subscriber. The process begins in step S1, where an inquiry is made regarding whether a subscriber is within a LOS distance from the MLBS. If the response to the inquiry is affirmative, the process proceeds to step S2, where the subscriber is configured to be directly connected to the MLBS station. Accordingly, by directly connecting the subscriber to the MLBS the load on the system capacity of the more narrow band MK segment is minimized. If the response to the inquiry in step S1 is negative, the process proceeds to step S3, where an inquiry is made regarding whether the specific protocol employed by the subscriber is supported by the IS. If the response to the inquiry in step S3 is affirmative, then the connection is selected in step S4 for connection via that IS. However, if the response to the inquiry in step S3 is negative, the process proceeds to step S5 where another inquiry is made regarding whether a broadband interactive communications link is available. If so, then a connection is selected using another media other than the IS. However, the response to the inquiry in step S5 is negative, the process proceeds to step S7, where an inquiry is made regarding whether coverage is available by way of a MK base station. If the response to the inquiry in step S7 is affirmative, the process proceeds to step S8 where a connection is established between the subscriber and the MK base station, albeit at less than the broadband capacity offered by the ML segment. If the response to the inquiry in step S7 is negative, the process proceeds to step S9, where the subscriber is configured to be connected via another media, such as a PSTN connection, fiber optic wired connection, proprietary data link, or the like.

Protocol selection principally relates to densely populated areas, where different media are available, and usually different services are required. In more thinly populated areas, the MK base station may be used for broadband, interactive transmissions towards the main central controller (HC) as shown in H3. This is possible because in the more thinly populated areas the demand for system capacity is lower than in the more densely populated areas.

Returning to FIG. 3 for a moment, FIG. 3 shows one possible IMMBRA-scenario. The densely populated areas contained within the solid line region. Within this area, broadband interactive coverage is created directly towards the ML base station or towards the IS, via the MLBS, although the MK base station microcell may be directly connected to the HC so as to provide broadband interactive connection. Within densely populated areas, broadband interactive connections, however, is not created directly towards the macro cell MKBS, as a general rule so as to conserve system capacity. The HC is the unit which is the superior controller to the base stations and which is the prime port for the system for communicating with other communication networks, such as the PSTN, satellite links or the like. The area that is covered with the dashed lines around the MLBS, show areas where there is a great probability that the subscriber may be covered directly with the MLBS. Moreover, these circles indicate that there is a high probability that LOS coverage is available for the MLBS of 5 km, provided there are no obstacles. When obstacles do occur, or supplemental coverage is needed, ML repeaters may be provided for extending coverage to particular areas. The ML repeaters operate on the principal that the signals are received directly from the ML base station to the repeater, and the repeater then retransmits the signal as part of an extended ML segment. Redundant coverage contributes to an increase in a degree of coverage, and thus it is a reasonable method to increase the degree of coverage for instance from 50 to about 80% of the potential subscribers. Going beyond 80% for conventional systems, depending on the geographical terrain and the number of obstacles present, may increase cost substantially to provide repeater access or other dedicated services for connection to the MLBS. On the other hand, by employing the present invention, using the IS devices that support both the ML segment as well as the MK segment, coverage above and beyond 80% is possible, because line-of-sight communication is not required exclusively.

Figure 5:
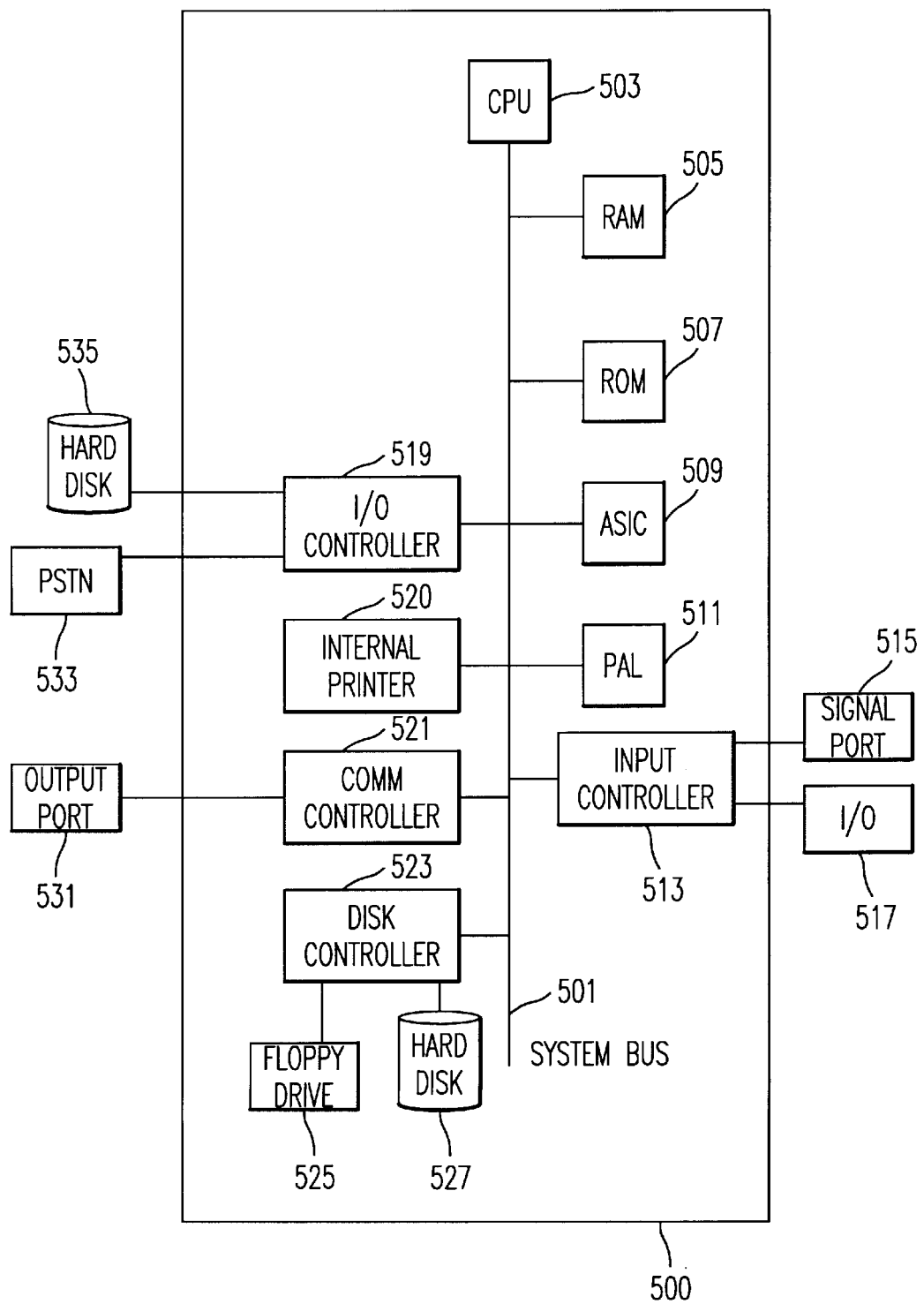
FIG. 5 is a block diagram of a controller portion of an IMMBRA terminal according to the present invention.

FIG. 5 represents a block diagram of components employed in the controller 100 (FIG. 2). The controller 500 includes a system bus 501, that interconnects a software programmable central processing unit (CPU) 503. Software routines executed on the CPU 503, are initially retrieved from ROM 507 or from other devices such as hard disk 535, internal disk 527, floppy drive 525, or through external ports such as IO device 517 or external networks like PSTN 533. The application software executed on the CPU 503 results in the creation of temporary storage requirements which are accommodated with the RAM 505. These temporary storage requirements are met with the RAM 505 serving as a buffer that buffers data and channel symbols during the transmodulation process, as well as for the coding and decoding operations. Specific operations performed by the controller 501 may be implemented using the application specific integrated circuit 509 and/or programmable array logic 511.

An IO controller communicates over the system bus 501, for coordinating external communication by way of the IO controller 519. An internal printer 520 is available for producing hard copy printouts, for use during maintenance actions for example. Communication controller 521, coordinates communications with external port 531, which provides an output signal that contains the results of a transmodulation process, when the transmodulator is incorporated into the controller 500. The disk controller 523 coordinates data read and write operations between the floppy drive 525 and hard disk 527, with the rest of the system. The input controller 513, coordinates communications between the IO devices 517, which may be any one of various types of peripherals, as well as from signal port 515 which supports the flow of input signals. The signal port 515 may be accommodated using any one of a variety of interfaces, which include digital interfaces such as by way of the universal serial bus, EIA-232, ISDN, or IEEE 1394 ("firewire").

The present document contains subject matter related to that disclosed in international published patent application WO 98/26520, published on Jun. 18, 1998, the contents of which being incorporated herein by reference and to Swedish patent application 9604533-1, filed on Dec. 9, 1996, the contents of which being incorporated herein by reference.

The processes set forth in the present description may be implemented using a conventional general purpose microprocessor programmed according to the teachings of the present specification, as will be appreciated to those skilled in the relevant arts. Appropriate software coding may readily be prepared by skilled programmers based on the teachings of the present disclosure, as will also be apparent to those skilled in the relevant arts. The present invention thus also includes a computer-based product which may be hosted on a storage medium and include instructions that can be used to program a computer to perform a process in accordance with the present invention. The storage medium may include, but is not limited to, any type of disk, including floppy disk, optical disk, CD-ROMs, magneto-optical disk, ROMs, RAMs, EPROMs, EEPROMs, flash memory, magnetic or optical cards, or any type of media suitable for storage electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system for providing broadband radio access comprising:
   a millimeter wave segment having a millimeterwave base station and a millimeterwave antenna configured to provide line-of-sight communications between the millimeterwave base station and a subscriber terminal when a line-of-sight communication path is present between said millimeterwave base station and said subscriber terminal;
   an IMMBRA station with an IMMBRA antenna configured to communicate over another line-of-sight communications path with said millimeterwave base station; and
   a microwave communication segment having said subscriber terminal with a microwave terminal antenna configured to communicate using microwaves with said IMMBRA station, wherein
   said IMMBRA station being configured to close a communication link between said millimeterwave base station and a receiver coupled to said microwave terminal antenna through said IMMBRA station and said another line-of-sight communication path when the line-of-sight communication path is not present.

2. The system of claim 1, wherein:
said subscriber terminal including a microwave terminal.

3. The system of claim 1, wherein:
a communications bandwidth of said millimeterwave segment being greater than that of said microwave segment.

4. The system of claim 1, wherein:
said millimeter base station antenna being positioned at a location above surrounding objects;
said IMMBRA antenna being positioned above surrounding objects; and
said microwave terminal antenna not being restricted in positional height.

5. The system of claim 1, wherein:
said IMMBRA station including a frequency transposition mechanism con figured to retransmit a signal received from said millimeterwave segment in said microwave segment when the line-of-sight communications path is not present.

6. The system of claim 5, wherein:
said IMMBRA station includes a transmodulation mechanism configured to change a modulation imparted on signals in said millimeterwave segment to another modulation imparted on signals in said microwave segment.

7. The system of claim 6, wherein:
said transmodulation mechanism including
   a processor, and
   a computer readable medium encoded with computer readable instructions, said processor being programmed to implement a transmodulation function when said processor executes said computer readable instructions.

8. The system of claim 7, wherein:
said microwave segment and said millimeterwave segment being configured to use different modulation schemes, said different modulation schemes including QPSK, QAM, and OFDM.

9. The system of claim 8, wherein:
said IMMBRA station being configured to perform at least one of a signal coding operation, a signal interleaving operation, channel equalization and channel control.

10. An integrated microwave and millimeterwave terminal for broadband radio access, comprising:
- an IMMBRA antenna aligned in a line-of-sight communications path with a millimeterwave antenna of a millimeterwave base station to form a millimeterwave segment;
- a processor configured to adapt a signaling format of signals transmitted over said millimeterwave segment between said IMMBRA antenna and said millimeterwave antenna;
- a microwave antenna configured to receive energy from and transmit energy to a subscriber terminal in a microwave segment, wherein said IMMBRA antenna, said microwave antenna, and said processor being configured to close a communication link between said millimeterwave base station and said subscriber terminal when a direct line-of-sight communication path is not present between said millimeterwave antenna and said subscriber terminal, said subscriber terminal being configured to contain a microwave terminal.

11. The terminal of claim 10, wherein:
said IMMBRA antenna being positioned above surrounding objects; and
said subscriber terminal not being restricted in positional height.

12. The terminal of claim 10, wherein:
said processor including a frequency transposition mechanism configured to retransmit a signal received from said IMMBRA antenna in said microwave segment when the line-of-sight communications path is not present.

13. The terminal of claim 12, wherein:
said processor includes a transmodulation mechanism configured to change a modulation imparted on signals in said millimeterwave segment to another modulation imparted on signals in said microwave segment.

14. The terminal of claim 13, wherein:
said transmodulation mechanism including,
- a computer readable medium encoded with computer readable instructions, said processor being programmed to implement a transmodulation function when said processor executes said computer readable instructions.

15. The terminal of claim 14, wherein:
said microwave segment and said millimeterwave segment being configured to use different modulation schemes, said different modulation schemes including QPSK, QAM, and OFDM.

16. The system of claim 14, wherein:
said processor being configured to perform at least one of a signal coding operation, a signal interleaving operation, channel equalization and channel control.

17. A method for providing broadband radio access to a subscriber terminal, comprising steps of:
- determining whether the subscriber terminal is within line-of-sight coverage of an antenna for a millimeterwave base station;
- directly connecting said subscriber terminal to said millimeterwave base station when it is determined in said determining step that a line-of-sight communication path is present;
- connecting said subscriber terminal to the millimeterwave base station by way of an IMMBRA station having a microwave base station when said subscriber terminal is within a coverage range of said microwave base station but not within line-of-sight coverage of said millimeter wave base station.

18. The method of claim 17, wherein:
said connecting said subscriber terminal to the millimeterwave base station step includes connecting said subscriber terminal to said millimeterwave base station if said line-of-sight coverage is available, and connecting said subscriber terminal to said IMMBRA station when said line-of-sight coverage is not available.

19. A communication system for providing broadband radio access comprising:
- means for transmitting millimeterwave signals to a subscriber terminal via a millimeterwave segment when a line-of-sight communications path is present; and
- means for communicating from the subscriber terminal with millimeterwave signals and microwave signals, including means for closing a communications link between said subscriber terminal and said means for transmitting by communicating with said subscriber terminal using microwave signals and communicating with said means for transmitting using millimeterwave signals.

20. The system of claim 19, wherein:
said subscriber terminal includes means for communicating with microwave signals.

21. The system of claim 20, wherein:
a communications bandwidth of said millimeterwave segment being greater than that used for said microwave signals.

22. The system of claim 19, wherein:
said means for transmitting millimeterwave signals includes means for elevating a millimeterwave antenna to a location above surrounding objects.

23. The system of claim 19, wherein:
said means for communicating with millimeterwave signals and microwave signals includes means for transposing a signal between a millimeterwave frequency and a microwave frequency.

24. The system of claim 19, wherein:
means for communicating with millimeterwave signals and microwave signals includes means for changing a modulation imparted on signals in said millimeterwave segment to another modulation imparted on microwave signals.

* * * * *

UNITED STATES PATENT AND TRADEMARK OFFICE
CERTIFICATE OF CORRECTION

PATENT NO. : 6,188,873 B1
DATED : February 13, 2001
INVENTOR(S) : Wickman et al.

It is certified that error appears in the above-identified patent and that said Letters Patent is hereby corrected as shown below:

<u>Title page,</u>
Item [30], Foreign Application Priority Data, has been omitted.
Item [30] should read as follows:

-- [30]    Foreign Application Priority Data

Dec. 9, 1996        (SE)……………………....9604533-1 --

Signed and Sealed this

Twentieth Day of November, 2001

Attest:

*Nicholas P. Godici*

NICHOLAS P. GODICI
*Attesting Officer*    *Acting Director of the United States Patent and Trademark Office*